(12) United States Patent
Hill

(10) Patent No.: US 6,817,816 B2
(45) Date of Patent: Nov. 16, 2004

(54) TAPPING ASSIST FASTENING ELEMENT AND METHOD

(75) Inventor: James Allen Hill, Milford, MI (US)

(73) Assignee: ND Industries, Inc., Clawson, MI (US)

( * ) Notice: Subject to any disclaimer, the term of this patent is extended or adjusted under 35 U.S.C. 154(b) by 0 days.

(21) Appl. No.: 10/217,034

(22) Filed: Aug. 13, 2002

(65) Prior Publication Data

US 2004/0033122 A1 Feb. 19, 2004

(51) Int. Cl.$^7$ .............................................. F16B 39/30
(52) U.S. Cl. ...................................................... 411/309
(58) Field of Search ................................ 411/301, 385, 411/386, 435–437; 470/25, 26

(56) References Cited

U.S. PATENT DOCUMENTS

| | | | |
|---|---|---|---|
| 3,314,326 A | 4/1967 | Bedford, Jr. ............... | 411/437 |
| 3,326,260 A * | 6/1967 | Tucker ...................... | 411/303 |
| 3,345,899 A | 10/1967 | Fiddler ...................... | 411/437 |
| 3,364,807 A | 1/1968 | Holton ....................... | 411/436 |
| 3,387,642 A | 6/1968 | Bennett ..................... | 411/303 |
| 3,388,732 A | 6/1968 | Holton ....................... | 411/167 |
| 3,926,236 A * | 12/1975 | Pouch et al. .............. | 411/179 |
| 3,985,172 A | 10/1976 | Ballantyne ................. | 411/179 |
| 3,996,834 A | 12/1976 | Reynolds ................... | 411/436 |
| 4,347,636 A | 9/1982 | Capuano ..................... | 470/25 |
| 5,667,870 A | 9/1997 | McCullough ............... | 428/131 |
| 6,164,889 A | 12/2000 | Konig ........................ | 411/436 |
| 6,170,858 B1 * | 1/2001 | Berger ....................... | 411/301 |
| 6,626,067 B1 * | 9/2003 | Iwinski et al. ............. | 81/121.1 |

* cited by examiner

*Primary Examiner*—Robert J. Sandy
*Assistant Examiner*—Ruth C. Rodriguez
(74) *Attorney, Agent, or Firm*—Liniak, Berenato & White

(57) ABSTRACT

A fastening element and method that utilizes a fastener or stamping which is capable of forming a fastening assembly by engagement with a self-tapping fastener is disclosed. The fastening element includes one or more indentations formed within a portion of the circumference of an unthreaded bore located within the fastening element. Each indentation has an edge that can have the same helix angle or pitch as the self-tapping fastener that it is to engage to serve as a guide to properly align the fastener within the bore. The indentations also assist formation of mating threads within the element by significantly reducing the required end load to start the tapping process.

43 Claims, 14 Drawing Sheets

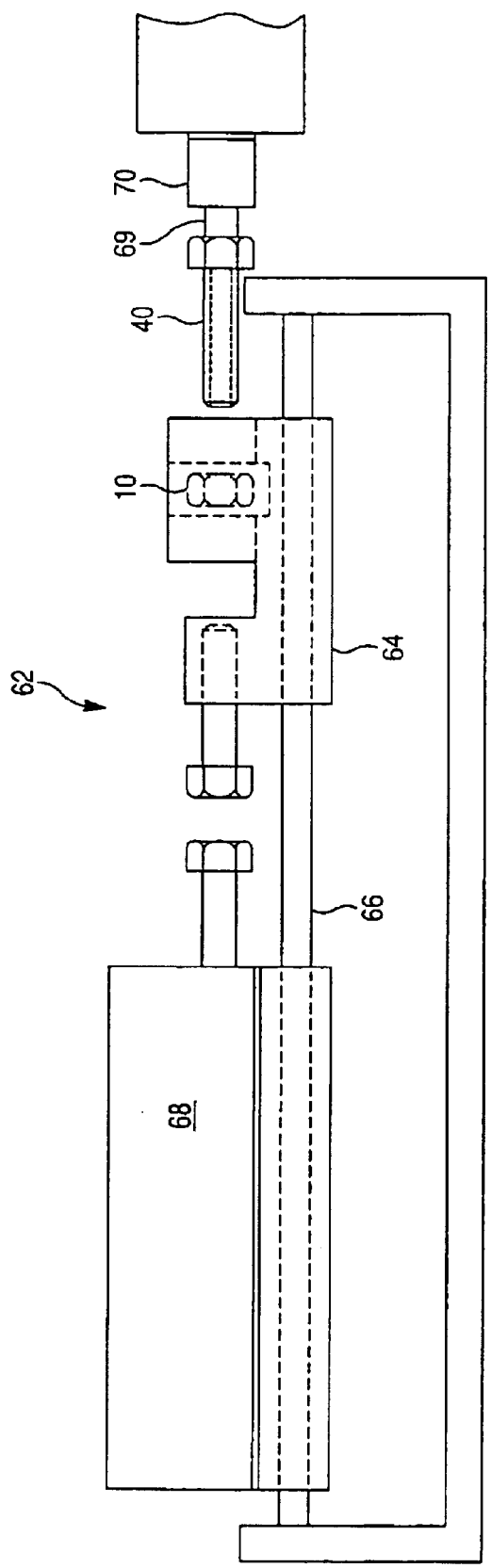

TAPPING ASSIST FASTENING ELEMENT AND METHOD

FIELD OF THE INVENTION

This invention relates to fasteners and self-tapping fasteners that form internal threads using a swaging or roll forming process. More particularly the invention relates to a fastening element and method capable of forming a fastener assembly by engagement with a self-tapping fastener that reduces the required end load to start the tapping process and assists in the proper alignment of the self-tapping fastener.

BACKGROUND OF THE INVENTION

Self-tapping fasteners such as self-tapping screws or bolts fall into two broad classes. The first are those which are provided with cutting edges at the work entering end. The second and most common type are those which are so designed to form uniform load carrying internal threads into untapped fasteners or pilot holes with a swaging operation. Fasteners of the first type have numerous disadvantages and one of the most significant being that they all form chips which are cut from the body to which they are driven. As a result, self-tapping fasteners that form threads by deforming a thread pattern within a pilot hole have become the most popular design. Such fasteners are available from a variety of sources and are marketed under the trademark TAP-TITE® in connection with a trilobular or three-lobe thread forming blank design.

FIGS. 1–2 illustrate a conventional three-lobed fastener according to the prior art. All threads have a characteristic pitch and diameter because of the lobulation of the threads, the radial offset from the axis will vary about the circumference. In general, standard thread diameters and pitches are provided to lobular fasteners, but the lobes tend to have a slightly larger diameter than a standard thread diameter. This enable the lobes to positively form corresponding internal threads as the fastener is driven into an appropriately sized pilot hole into the shape of conforming internal threads.

As the fastener is rotated the lobes engage the inner wall of the pilot hole (not shown) and begin to displace material within the pilot hole. In a typical self-tapping fastener, the threaded fastener is provided with a stabilizing zone having stabilizing threads at the end of a fastener shaft and a thread forming zone with corresponding thread forming threads along the shaft of the fastener adjacent the stabilizing zone. The stabilizing zone as illustrated in FIGS. 1–2 often has a reduced diameter enabling it to fit within an initial untapped hole in a relatively perpendicular fashion. The thread forming zone often has a sloped or tapered shape with a diameter that increases linearly between the stabilizing zone and the full diameter main body of the fastener.

Prior known constructions have often provided the thread stabilizing zone and the thread forming zone with a higher out of round than the full diameter main body. In one example, the out of round of the thread forming zone gradually tapers back from the highest out of round adjacent to the stabilizing zone toward the lower out of round that defines the full diameter main body. In another often preferred example, the thread forming zone can define an approximately constant profile high out of round along its entire axial length that transitions step wise at the main body into the characteristic lower out of round. In connection with either example, there is a difference between the high out of round at the stabilizing section and at the main body cross section.

As a self-tapping fastener is driven into an untapped pilot hole the thread forming threads encounter the sidewalls of the hole initially. These threads often exhibit an increasing outer diameter and higher out of round. As such, the lobes are able to gradually apply increasing thread forming pressure to the pilot hole until each formed internal thread is contacted by the first full diameter thread. This first full diameter thread often has the out of round profile of the rest of the main body. It provides final formation of each thread in the pilot hole to the desired shape.

Self-tapping threaded fasteners are frequently preferred in applications where it is possible to use a metal screw which is harder than the material of a mating element such as a blank or nut through which a threadless bore for the screw has been made. In general, properly forming internal threads in a bore requires several swaging blows from the underlying lobes of the fastener. This process, in essence, forms a shape in the ductile metal of the untapped pilot hole or fastener corresponding to the threads of the self-tapping fastener. A sufficient number of forming threads is necessary to complete the process. Depending upon the nature and hardness of the metal into which a self-tapping fastener is driven, a relatively high driving torque is usually required, particularly in metal having an appreciable thickness. This often results in a stripping torque to driving torque ratio that is relatively low. The requirement of high driving torque not only creates problems with respect to drivability but a low driving torque to stripping torque ratio can restrict the usage of automated power drivers in assembly lines.

It is well known that the driving torque of individual fasteners can vary considerably due to the presence of any lubricant, slight variations in the material hardness into which the fastener is driven, in the hole size, in the fastener diameter, as well as dullness of cutting edges or from misformed or damaged threads (especially the lead threads) from handling or processing such as plating. Similarly, failure torque, including stripping torque of the mating threads as well as the failure torque of the fasteners themselves can vary somewhat considerably from one fastener to the next. The clutch or related mechanisms of the power drivers cannot be relied upon to disengage at precisely the same torque value each time. If the driver is set just above the normal driving torque, and any of these variations causes an increase driving torque, conventional tapping fasteners will not be driven in fully and loose assemblies could result. If the driver clutch is so adjusted to give a greater driving torque so as to overcome any such difficulty, a conventional tapping fastener can then be overdriven, resulting in stripped threads or broken fasteners, either of which will result in costly delays of the assembly line while repair or replacement is made.

It is also known, that in many cases the efficiency and thus the usefulness of self-tapping operation can be problematic, particularly because at the beginning of each operation considerable pressure or end load must be applied by means of a conventionally used power driven tool to cause the self-tapping screw to properly start winding itself into the material adjacent the cylindrical surface defining the threadless bore. Such forces can make proper alignment difficult. Difficulties may be encountered when the bore is originally, or thereafter becomes oriented at an angle relative to a driven self-tapping fastener such that the fastener is not in perfect alignment with the axis of the bore. As a result, the fastener may become permanently askew and not seat properly. This can be where the lead thread of the fastener is initially slightly misformed or thereafter becomes distorted.

Such problems have been acute where for example, the bore axis extends horizontally and the self-tapping fastener is driven from a position relatively higher than or relatively lower than the axis. In many such instances, the threads of the self-tapping fastener which are designed to form threads within the bore upon proper engagement then are mangled or otherwise distorted. If the resulting assembly is formed at all, it may have significantly impaired holding characteristics since the underside of the fastener itself may be damaged and thus weakened. Additionally, the entire fastening assembly may be weakened and put in jeopardy. Moreover, the cocked or askew fastener head may have roughened the surface of the structural element containing the bores such that it would not hold paint, or such that the thickness of such element may be reduced and consequently the entire assembly may become weak. The askew screw head appearance also is undesirable. Frequently, in such situations a new fastener must be driven into the bore, new bore formed, or the part must be scrapped entirely.

In order to try and overcome these drawbacks and to make the process go more quickly, a high out of round, which concentrates the force of the blows generated by the underlying lobes of the fastener has often been utilized. Use of a high out of round within the main full diameter threads, reduces the amount of torque that must be applied to form threads. However, this lower torque comes at a price, since it results in less diametrical material remaining in contact with the internal thread once it is formed. Hence, such fasteners will not hold as much load as a more round fastener. This increases the chances of failure occurring in such a fastener system. Such failure in general results from axial pull out, or when thicker nut members are used, fracture. Also, since area varies by the square of the radius, the use of a higher out of round cross-section results in a significantly reduced cross-sectional area, which lowers the screws failure limit. Hence, self-tapping screws typically use an out of round dimension that is a compromise between the optimum value for thread forming efficiency and the optimum value for resistance to failure.

Another drawback of self-tapping fasteners is that in order to engage a pilot hole and begin forming threads, they necessarily are initially pulled somewhat out of proper alignment. If the thread forming fastener does not start in a straight line like a normal threaded bolt and nut combination for example, then the threads can be improperly formed and can pose further problems if the fastener is ever removed and then reinserted, since cross threading or additional thread cuts will then likely result. It is the inherent nature of a thread forming fastener to start out of alignment and subsequently straighten up. In order to accomplish this, the undesirable application of significant additional torque to drive the fastener is often required. In some castings with unthreaded bores this has lead to cracking of the casting itself.

To date, great effort has been placed into modifying the geometry construction of self-tapping fasteners such as screws or bolts in order to try to overcome these above stated problems, but they have still left significant issues or compromises. Since most all self-tapping fasteners are designed to create uniform load carrying internal threads into untapped nut members or other similar bores upon installation, the structure and the geometry of the untapped bore has not been given equal attention as a potential solution to these problems. Most modifications to unthreaded nuts or mating type fasteners have been directed to nuts that have a particular structure that assists in aligning the screw or bolt that is to be mated with the self-tapping fastener. Known solutions directed to threadless nut type fasteners have generally involved extensive and complicated geometries that project inwardly from the untapped sidewalls and have not decreased the required driving torque and are cumbersome and expensive to form.

Several solutions involving a fastening element designed to form a fastener assembly by engagement with a self-tapping screw have been proposed. One such construction provides a threadless bore having a varied diameter and an inwardly protruding rib that has at least one interruption therein. This rib, however, extends substantially around the 360° circumference. Such a construction involves considerable complication and expense in forming the rib and also requires the self-tapping fastener to remove or form an internal thread through the rib itself.

Another known self threading fastener device for use with a threaded member utilizes a generally helical rib formed from the material of the side wall protruding inwardly from the side wall. The rib is helically inclined so its angle of inclination corresponds generally to the angle of inclination of the threads on the threaded member. The rib must span the entire circumference of a section of the unthreaded bore. This design is quite complicated and therefore, expensive to form and again necessitates the thread forming fastener to engage and cut threads through the inwardly projecting helical member. This has often lead to increasing the required end load or force required to start the tapping process and cracking the fastening device.

It is apparent from the drawbacks of the prior known constructions set forth above that there exists a need for an improved threadless fastening element for use with a self-tapping fastener that overcomes these drawbacks and provides additional benefits and advantages.

SUMMARY OF THE INVENTION

In accordance with a first aspect of the invention, there is provided fastening element and method for forming a fastener assembly by engagement with a self tapping fastener comprising a solid body having a threadless internal substantially cylindrical surface defining a bore having an axis and extending through all or a portion of a solid body, and at least one indentation, preferably of a substantially elliptical configuration extending inwardly from a portion of the top of the bore or a lead in to the bore. The indentation extends around the circumference of the cylindrical inner surface from about 1° to greater than 360° and in some preferred embodiments from about 15° to about 360° in accordance with certain aspects of the invention. The helix angle or pitch of the indentation of the threadless bore can be specially dimensioned for engagement by a standard size self tapping fastener. More specifically, the indentation of the threadless bore may take the form of a narrow scribe like line having a flat, notched, rounded or angled base or a wider notch that is approximately equal to or greater than the distance between threads of the self tapping fastener.

A further aspect of certain embodiments is to provide a plurality of indentations which in total extend less than the entire 360° circumference of the threadless bore. Regardless of the type or number of indentations used, all the indentations can extend only a very slight depth into the internal surface of the thread bore, and in most all cases, significantly less than the depth of the thread to be formed by the self tapping fastener.

The indentation provided in the internal surface of the threadless bore can also initially act as a guide and alignment device for the self tapping fastener. Upon assembly, the end load or force required to start the tapping process is significantly reduced as the self tapping fastener passes the indentation and engages the portion of the threadless bore without the indentation forming threads in the bore. As a result the differential between the driving torque and the failure torque of the self tapping fastener is significantly altered, thereby resulting in fewer failures and significantly reducing the risk thereof while assisting in monitoring proper alignment.

It is therefore a primary object of the present invention to provide a new and improved fastening element for forming a fastener assembly by engagement with a self tapping fastener as set forth above that assists in aligning the fastener and/or decreases the end load required to start forming threads in the element.

BRIEF DESCRIPTION OF THE DRAWINGS

These and other aspects and objects of the invention will become better understood from the following detailed description of various embodiments thereof, when taken in conjunction with the drawings wherein:

FIG. 10 is a test apparatus utilized to measure end load and drive torque values for various embodiments of the present invention;

DETAILED DESCRIPTION OF CERTAIN PREFERRED EMBODIMENTS

Figure 1:
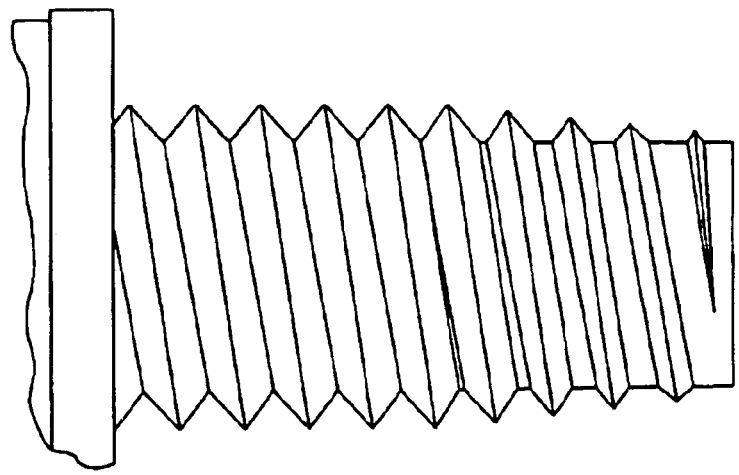
FIG. 1, already described, is a side view of a self tapping fastener according to the prior art.

Referring to the drawings, and in particular FIGS. 3–4A and 9A–D thereof, there is illustrated one embodiment of the fastening element of the present invention designated generally at 10. In this particular embodiment, the fastening element of the present invention, is in the form of a weld nut 12 with a pilot 14. It should be understood that the construction and principles of the present invention are not restricted to weld nuts, fasteners with pilots or nuts in general but rather this embodiment is only exemplary of the present invention which can be utilized with all manner of threadless bores contained in fasteners or castings that are susceptible of having internal threads formed therein by engagement with a self-tapping fastener or a tap in a nut tapping process. The fastening element of the present invention is also capable of forming a fastener assembly by engagement with all manner of self-tapping fasteners such as, screws, bolts, studs and the like having a variety of different constructions. The illustrations and descriptions herein of both the fastening element and self-tapping fastener are meant to be exemplary and not limiting.

Figure 3:
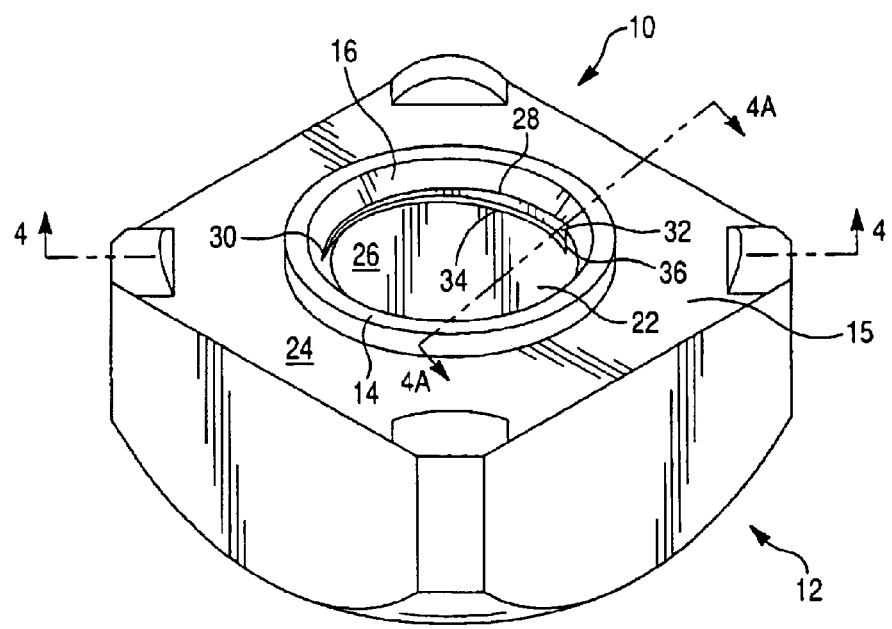
FIG. 3 is a perspective view of one embodiment of the present invention.

The fastening element 10 as illustrated in FIG. 3 has a pilot 14 extending upwardly from its top 15. The pilot 14 features an angled lead in area 16 located around its internal circumference. The non-pilot end 18 of the element 10 also has an angled or rounded lead in area 20 located between the respective lead in areas 16 and 20 is a bore 22 that extends through the entire body 24 of the element 10. In the case of a blind hole in a casting for example, the bore would not extend through the entire body. The internal surface 26 of the bore 22 is non-threaded. The diameter of the bore 22 is continuous and uninterrupted except for a small portion of the circumference thereof that is adjacent the lead in area 16 of the pilot 14.

To facilitate the entrance of a self-tapping fastener into the bore 22 of the element 10 and reduce the end load required to begin the tapping process, one or more indentations 28 are provided in the bore 22 adjacent the lead in area 16. In the embodiment illustrated in FIGS. 3–4A the element 10 utilizes a single indentation 28 that extends less than the entire circumference of the bore 22. The indentation 28 is tapered in an axial direction with the thinnest portion being adjacent the lead end 30 and the thickest portion being adjacent the trailing end 32 of the indentation 28 for a normal right handed threaded fastener. The ends 30 and 32 terminate preferably on a helix. Likewise, the bottom edge 34 preferably has a helix angle or pitch that prefereably corresponds to the pitch of the thread on the fastener with which the element is intended to be used. The edge 34 may be flat or angled as illustrated in FIGS. 9B and 9D. The edge may also have a helix angle or pitch that does not correspond to the pitch of the thread on the fastener with which the element is intended to be used. In such cases, similar beneficial results in the reduction of end load are achievable, however, the benefits in aligning the self-tapping fastener are usually not as high.

The depth of the indentation can vary from a small fraction of the ultimate depth of the threads to be formed in the bore 22 to a maximum depth that equals the depth of the threads or the difference between the major and minor diameter of the fastener. Preferably, the depth of the indentation 28 is greater than zero but less than and in most preferred cases substantially less than the depth of the ultimate thread that is to be formed in the bore 22. Regardless of its depth the overall indentation is always smaller in one or more dimensions than the ultimately formed thread. The depth of the indentation in the bore is preferably, although not necessarily, substantially constant along its length. It has been found that even such slight indentations permit a significantly reduced end load required to start the self-tapping fastener in the element. It has also been found that the indentations allow a low end load even for a slightly misformed or damaged lead threads on a self-tapping fastener that could adversely effect the alignment and further guide the fastener to start and therefore finish in a straighter alignment within the element.

Figure 4:
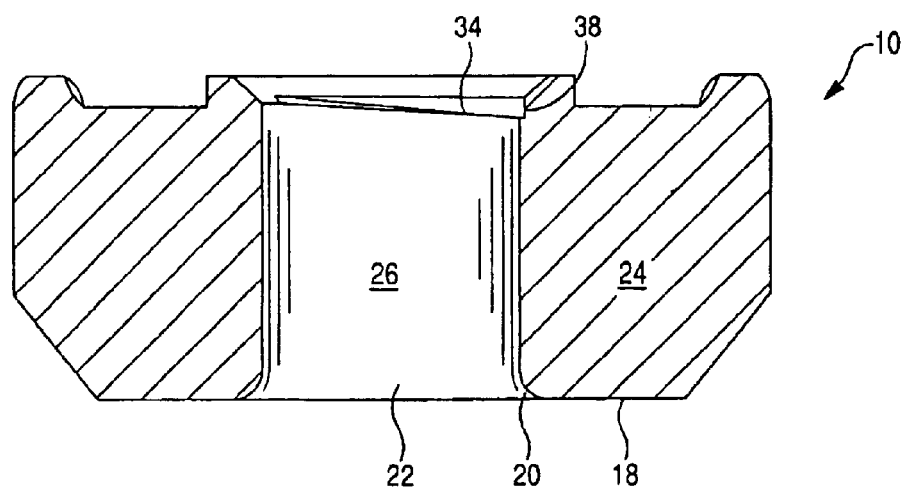
FIG. 4 is a cross-section taken along line 4—4 of FIG. 3.
Figure 4A:
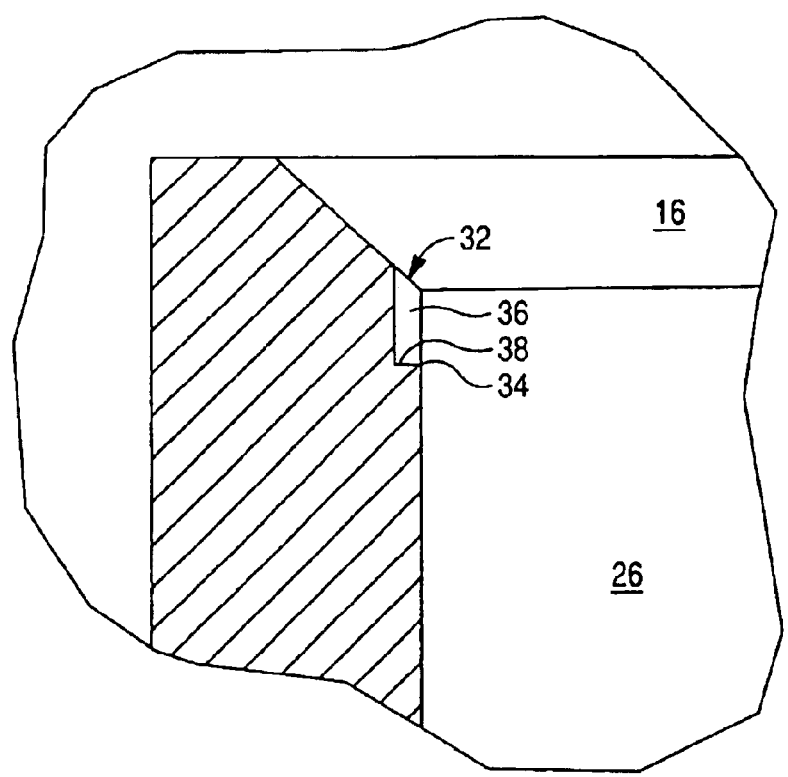
FIG. 4A is a cross-section taken along line 4A—4A of FIG. 3.

The trailing end 32 of the indentation 28 can terminate so as to create a notch 36 as illustrated in FIGS. 3 and 4A. In the alternative, the indentation may be tapered at the trailing end 32 from the full depth of the indentation back to the diameter of the non-threaded bore. The indentation extends circumferentially around the element as described, for a distance of about at least about 1° to greater than 360°, and most preferably about 15° to just under 360°. The base 38 of the indentation is preferably flat as illustrated although an angled, tapered or rounded construction (See FIGS. 6A, 11A and 12) could also be provided. Additionally, the lead end 30 of the indentation 28 preferably begins in the lead in area 16. In certain alternative embodiments, the lead end 30 can instead begin adjacent the lead in area 16 in the bore 22 or in a bore without a lead in area. The axial length of the widest portion of the indentation 28 at the trailing end 32 can extend up to a distance equal to the distance between respective thread crests of the self-tapping fastener or greater in some embodiments. The indentations may be formed in the bore 22 by a variety of known processes such as cold forming or cutting or tapping dies.

Figure 2:
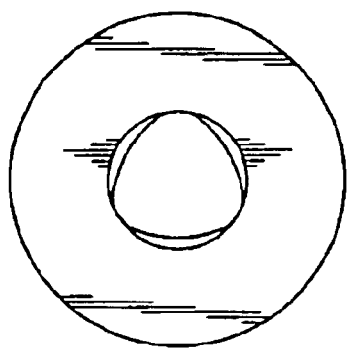
FIG. 2, already described, is a front end view of the fastener of FIG. 1.

Use of the embodiment of the fastening element 10 illustrated in FIGS. 3–4A will now be discussed with particular reference to FIGS. 9A–D. The element 10 is illustrated in combination with a self-tapping bolt designated generally as 40. Such trilobular self-tapping bolts are well known and are commercially available from a variety of sources under the trademark TAPTITE®. The fastener 40 has an out of round diameter with three lobes each having an increased radius measured from the center of the fastener similar to the design illustrated in FIGS. 1–2.

Figure 9A:
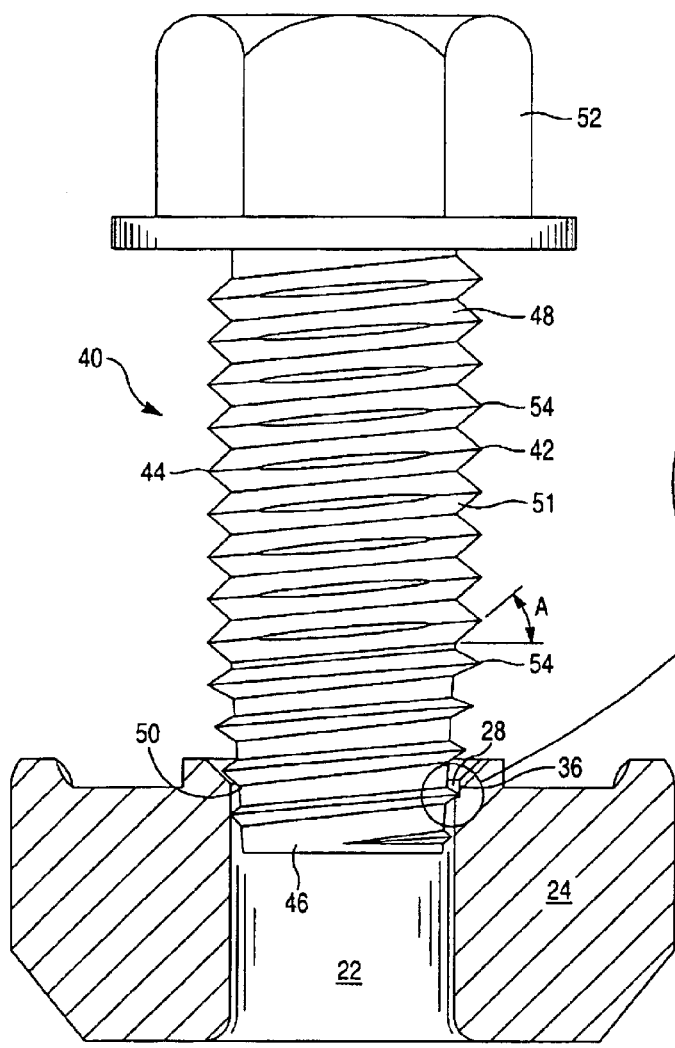
FIG. 9A is a partial cross-section of an embodiment of the invention shown in combination with a self-tapping fastener.
Figure 9B:
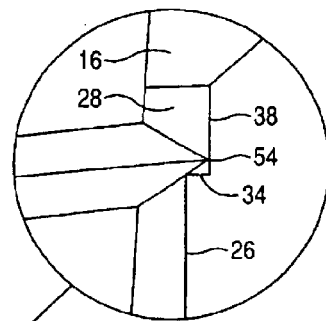
FIG. 9B is an exploded view of a portion of FIG. 9A.

Referring particularly to FIG. 9A, two such lobes 42 and 44 respectively are visible. The fastener 40 is provided with a stabilizing section 46 at the end of its shank. The diameter of the fastener 40 in this section is smaller than the diameter on the remainder of the shank 48. The reduced diameter of the stabilizing section 46 enables it to fit within an untapped pilot hole in a relatively perpendicular fashion without having its outer diameter contact the element 10. The fastener 40 is also provided with a continuous thread 54 along substantially its entire length beginning at the end of the shaft and continuing virtually the entire length of the shank 48. Moving along the fastener shank 48 away from the stabilizing section 46 and towards the head 52, a thread forming section 50 is provided. The thread forming section 50 has a tapered shape with a diameter that increases between the stabilizing section 46 and the full diameter main body 51. The thread has a continuous helix angle or pitch angle indicated as A.

As the fastener 40 is driven, it moves axially through the pilot 14 and partially into the bore 22. This axial movement into the bore 22 continues until the diameter of the fastener increases sufficiently in the thread forming section 50 until a portion of the thread 54 encounters the bottom edge 34 of the indentation 28. As previously indicated, the bottom edge 34 of the indentation 28 preferably has the same helix angle or pitch as the fastener 40. As a result, once the thread 54 of the rotating fastener 40 contacts the edge 34, the edge 34 acts as a guide properly aligning the fastener in an appropriate helical path to form the mating threads in the element 10. As the fastener 40 continues to rotate this thread 54 in engagement with the indentation, one of the lobes such as a lobe 42 will encounter the trailing end 32 of the indentation 28. At this point the fastener 40 will begin forming threads by deforming the bore 22 and the indentation 28.

Figure 9C:
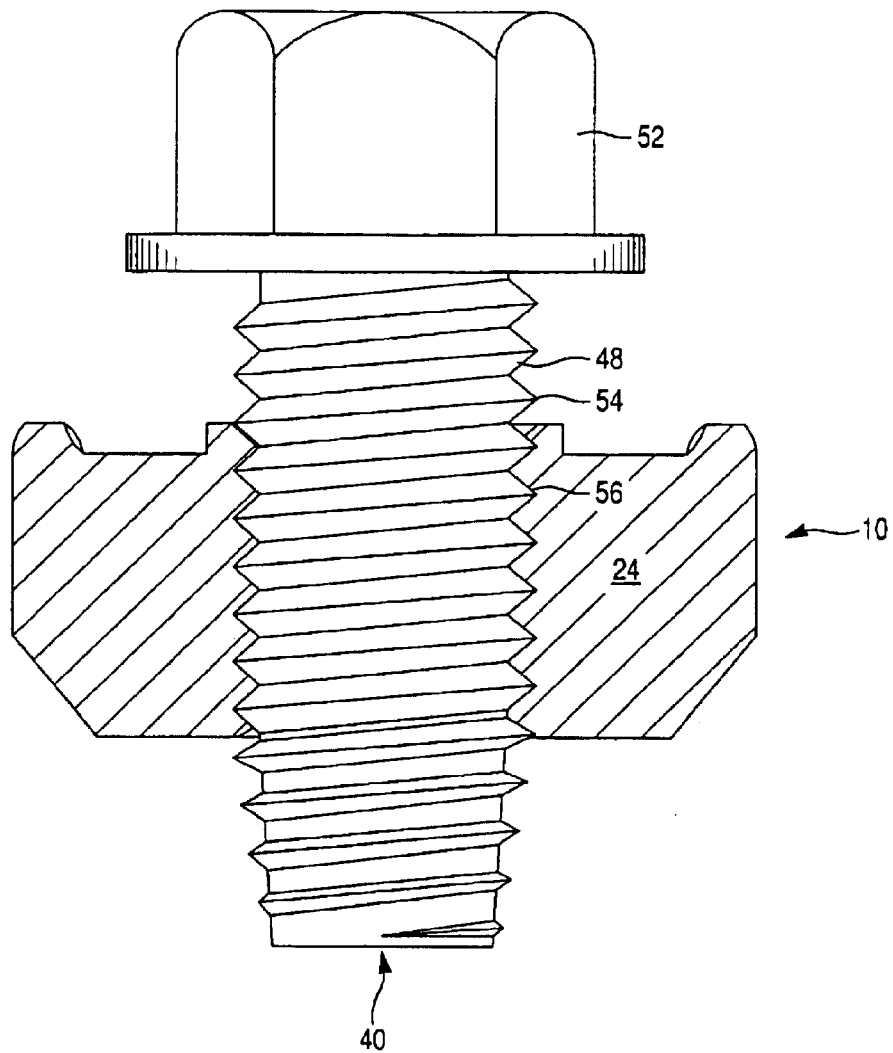
FIG. 9C is a partial cross-section of an embodiment of the invention shown in combination with a self-tapping fastener.
Figure 9D:
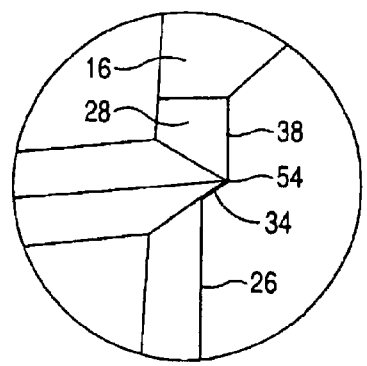
FIG. 9D is an exploded view of an alternative embodiment to the one illustrated in FIG. 9B.

As will later be discussed in detail, it has been found that provision of the indentation 28 with either a notch or a taper at the trailing end 32, ensures that the fastener 40 is properly aligned as it begins to form threads in the bore. It has also been found that such an indentation also significantly reduces the end load force required to form threads with the fastener since the first cut by the thread 54 of the fastener 40 is made into a notched or tapered sidewall 36 as illustrated for example in FIG. 4A, as opposed to a sidewall having a completely flat surface as in the prior art. This has proven to be even more advantageous where the lead thread is even slightly misformed or damaged. Once the threads begin to be formed by the fastener 40 in the element 10, the indentation 28 is replaced by a fully formed mating thread 56 as indicated in FIG. 9C. The reduction of required end load torque had proven to be so significant that the self-tapping fastener may usually be hand turned into an element to a point where the fastener is properly aligned and sufficiently engages the element to resist uncoupling. It has also been found that use of one or more indentations as described in the various embodiments of this invention, has not adversely effected the performance of the lead threads ultimately formed in the fastening element by the self-tapping fastener.

Figure 5:
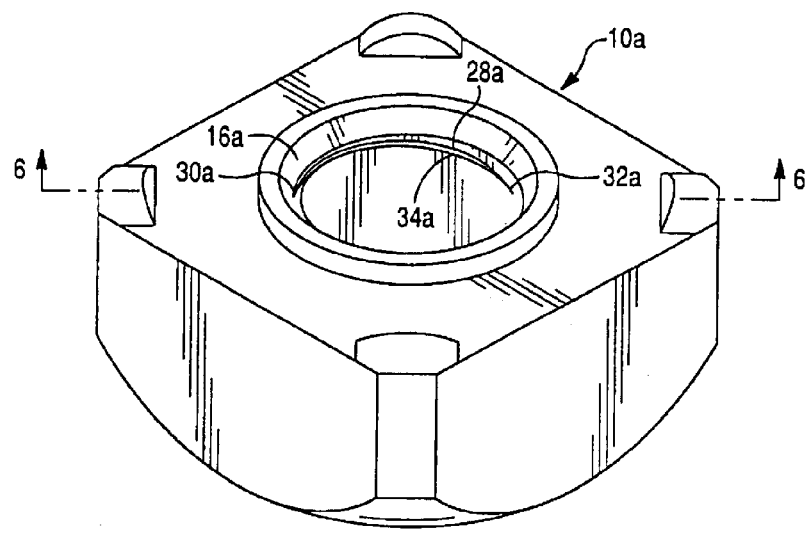
FIG. 5 is a perspective view of an alternative embodiment of the present invention.
Figure 6A:
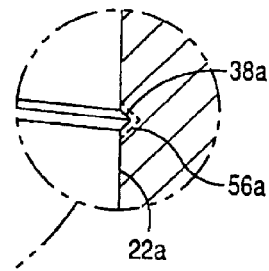
FIG. 6A is an exploded view of a portion of FIG. 6.
Figure 6:
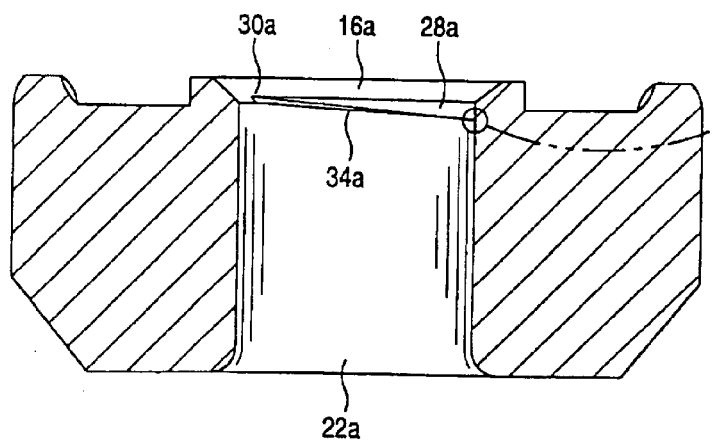
FIG. 6 is a cross-section taken along line 6—6 of FIG. 5.

In FIGS. 5 and 6 there is illustrated a modification of the fastening element designated generally at 10a, which is generally similar to that shown in FIGS. 3–4A with the suffix a added to the referenced numerals to indicate like parts. In this embodiment the indentation 28a has a slightly different form and geometry than that previously described. In this embodiment, the indentation 28a again extends to the same circumferential extent and depth as previously described. It also preferably, although not necessarily, has the same helix angle or pitch as the threads on the self-tapping fastener utilized to form threads therein. The indentation 28a, however, extends in a helical line and preferably has a substantially constant width along its entire circumferential length. As such, the indentation 28a of this embodiment does not create a notched cross-section that extends along the entire length of the indentation 28a from the top of the lead in area 16a or bore 22a to the bottom edge 34a. Instead, the indentation 28a forms a groove along a portion of the circumference of the bore that moves increasingly away from the lead in area 16a as the helical path between the lead end 30a and trailing end 32a is traversed. The width or axial length of the indentation 28a is preferably greater than zero and is less than that of an ultimately formed thread.

As illustrated in FIG. 6A the base 38a of the indentation 28a is preferably pointed and can also be angled to approximate the shape of the ultimate mating thread, illustrated in dotted lines as 56a that will be formed in the bore 22a. In the alternative, the base can also be rounded or flat (See FIGS.

4A and 12). Likewise, the trailing end 32a may terminate at the same depth as the remainder of the indentation 28a or may taper back to the surface of the bore 22a. In all of the embodiments illustrated and described with respect to FIGS. 5 and 6, the element 10a functions the same way in use as previously described with respect to the embodiments illustrated in FIGS. 3–4A and 9A–D and similar beneficial results have been achieved.

Figure 7:
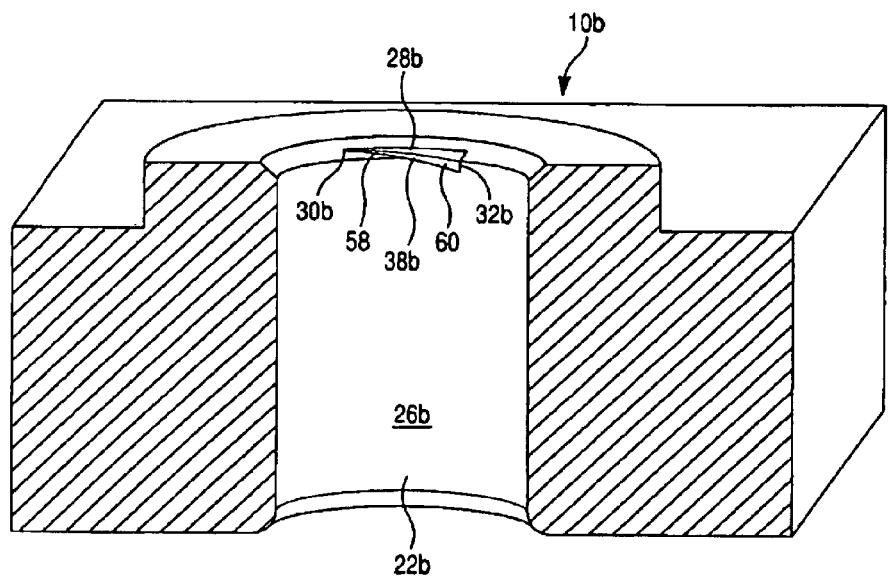
FIG. 7 is a perspective view of another alternative embodiment of the invention.
Figure 7A:
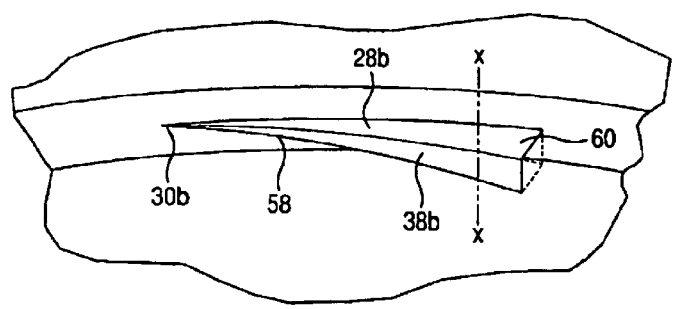
FIG. 7A is an exploded view of a portion of FIG. 7.

In FIGS. 7 and 7A there is illustrated another modification of the fastening device designated generally at 10b, which is generally similar to that shown in FIGS. 3–4A and 9A–D with the suffix b added to the reference numerals to designate like parts. In this embodiment the indentation 28b does not have a substantially constant depth over its length between the lead end 30b and the trailing end 32b. Instead the base 38b of the indentation 28b is provided with two separate sections, a tapered section 58 that extends from the lead end 30b and a constant depth section 60 that extends from the tapered section 58 to the trailing end 32b. The transition between the section 58 and the section 60 is designated by the line X—X in FIG. 7A.

In the illustrated example the tapered section 58 would be the first encountered by the self-tapping fastener, although the relative position of this section with the tapered section could be reversed. Likewise, the dividing line between the two sections 58 and 60 respectively, could occur virtually anywhere along the indentation 28b or the constant section 58 could be eliminated entirely and the depth of the indentation could be tapered or constant along its entire length. In certain preferred embodiments, the constant depth section 60 begins at a maximum depth and tapers toward the surface 26b of the bore 22b at the end of this section. This embodiment can utilize the construction details of the other embodiments described herein. The use, performance and characteristics of the embodiment illustrated in FIGS. 7–7A are the same or substantially similar to those previously described with respect to the embodiments illustrated in FIGS. 3–6 and 9A–D.

Figure 8:
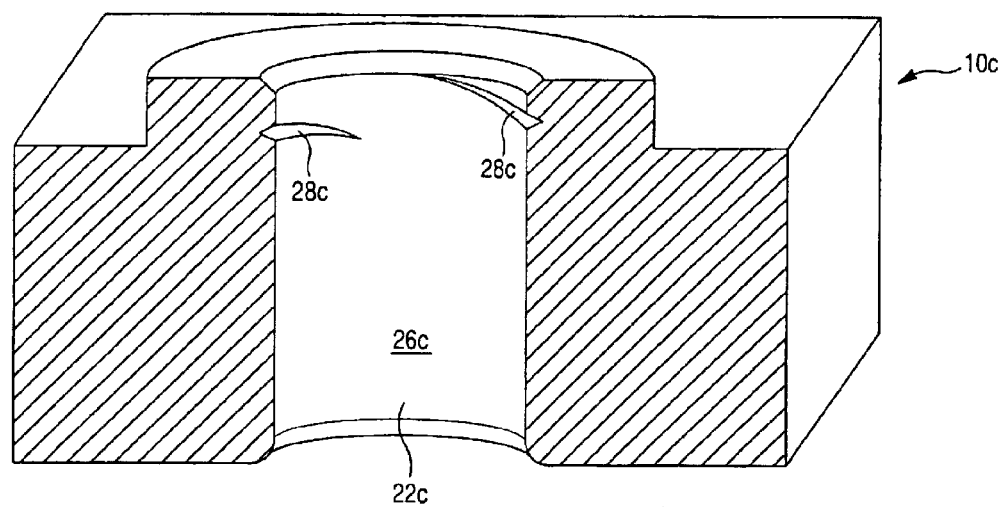
FIG. 8 is a cross-section of an alternative embodiment of the present invention.

FIG. 8 illustrates another modification of the fastening element 10c, which is generally similar to that shown in FIGS. 3–4A and 9A–D with the suffix c added to the reference numbers in order to designate like parts thereof. In this particular embodiment multiple indentations are provided around the circumference of the bore 22c, although two indentations are illustrated in this embodiment, it should be understood that more than two could also be provided. In most preferred embodiments the indentations 28c do not overlap. The indentations 28c are preferably equally spaced about the circumference of the bore 22c. By using multiple indentations in this embodiment, the thread of a self-tapping fastener is provided with multiple points of engagement and alignment around the circumference of the bore 22c. It is further preferred that when multiple indentations are used that the total circumference of all indentations not exceed 360°. The construction and configuration of the indentations 28c can take any of the forms that have been previously described. Likewise, the indentations 28c contained on the element 10c can take the form of any of the constructions described herein and yield similar results and advantages to those previously described.

Figure 11:
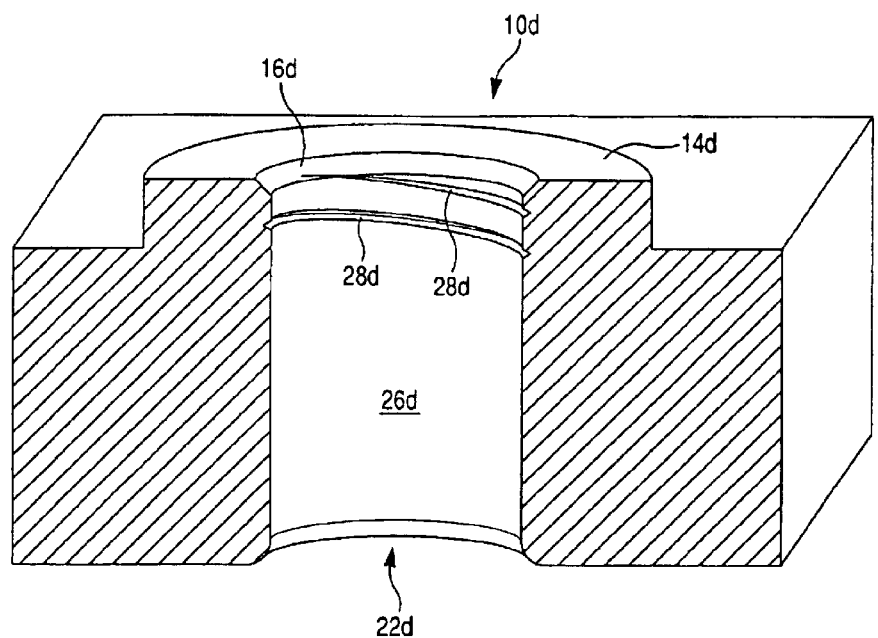
FIG. 11 is a cross-section of another alternative embodiment of the present invention.
Figure 11A:
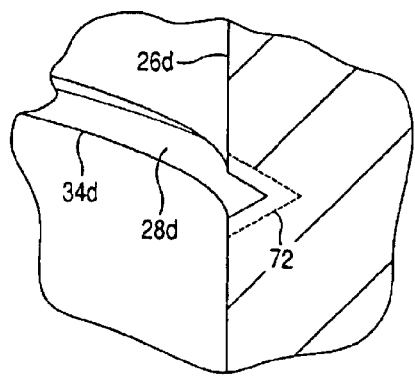
FIG. 11A is an exploded view of a portion of FIG. 11.

In FIGS. 11 and 11A a modification of the fastening element designated generally at 10d, which is generally similar to that shown in FIGS. 3–4A with the suffix d added to the referenced numerals to indicate the like parts. In this embodiment the indentation 28d has a slightly different form and geometry but is otherwise similar to those constructions previously described. In this embodiment, the indentation 28d is an angled groove that extends for more than the 360 degree circumference of the element 10d. Although the indentation 28d is illustrated as beginning in the lead in area 16d, it could instead begin in the internal surface 26d of the bore 22d.

Figure 12:
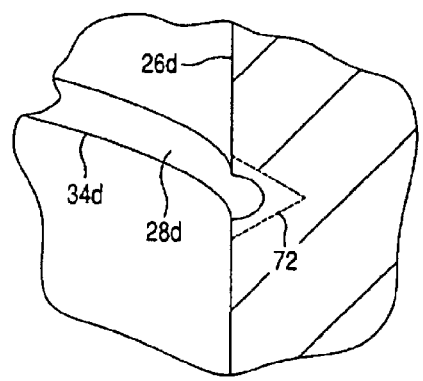
FIG. 12 is a partial cross-sectional view of another alternative embodiment of the present invention.

As with other previously described embodiments, the shape and length of the indentation can vary considerably because the self-tapping fastener will form over or reform and replace the indentation to match the thread profile. As a result, as illustrated in FIGS. 11, 11A and 12, the shape or profile of the indentation 28d can vary from the normal 60 degree angled thread profile to a rounded or virtually any other shape. The dashed lines designated 72 are the boundry areas which a full form thread will occupy when self-tapping is complete.

Figure 13:
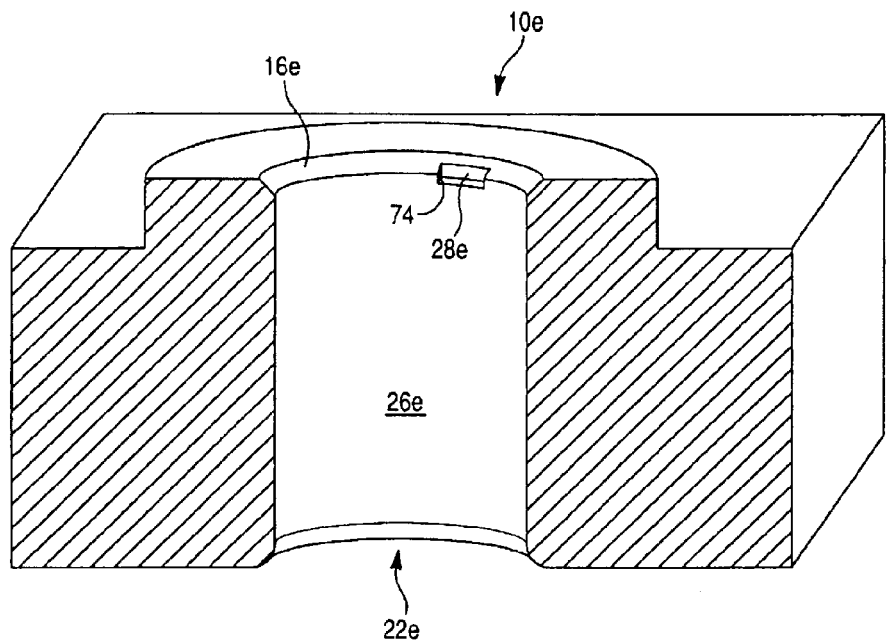
FIG. 13 is a cross-section of another alternative embodiment of the present invention.
Figure 13A:
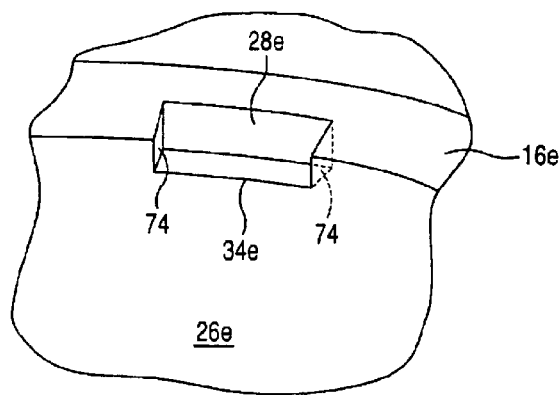
FIG. 13A is an exploded view of a portion of FIG. 13.

In FIGS. 13–13A a modification of the fastening element designated generally at 10e, which is generally similar to that shown in FIGS. 3–4A with the suffix e added to the referenced numerals to indicate like parts. In this embodiment the indentation 28e has a slightly different form and geometry but is otherwise similar to those constructions previously described. In this embodiment, one or more indentations 28e are provided with a generally rectangular notch-type configuration. The sidewalls 74 preferably extend at an angle of about 90 degrees (or greater or less than 90 degrees) from the lead in area 16e and/or the internal surface 26e of the bore 22e. The depth of the indentation 28e is no greater than, and preferably less than, the depth of the ultimately formed thread in the bore 22e.

The angle of the bottom edge 34e may either be the same as the helix angle of the self-tapping fastener or different. Either such design provides at least some beneficial effect on alignment of the self-tapping fastener and allows it to start tapping with reduced end load. The previous descriptions regarding the use, performance, characteristics and construction of this embodiment are the same or substantially similar to those embodiments previously described.

Figure 14:
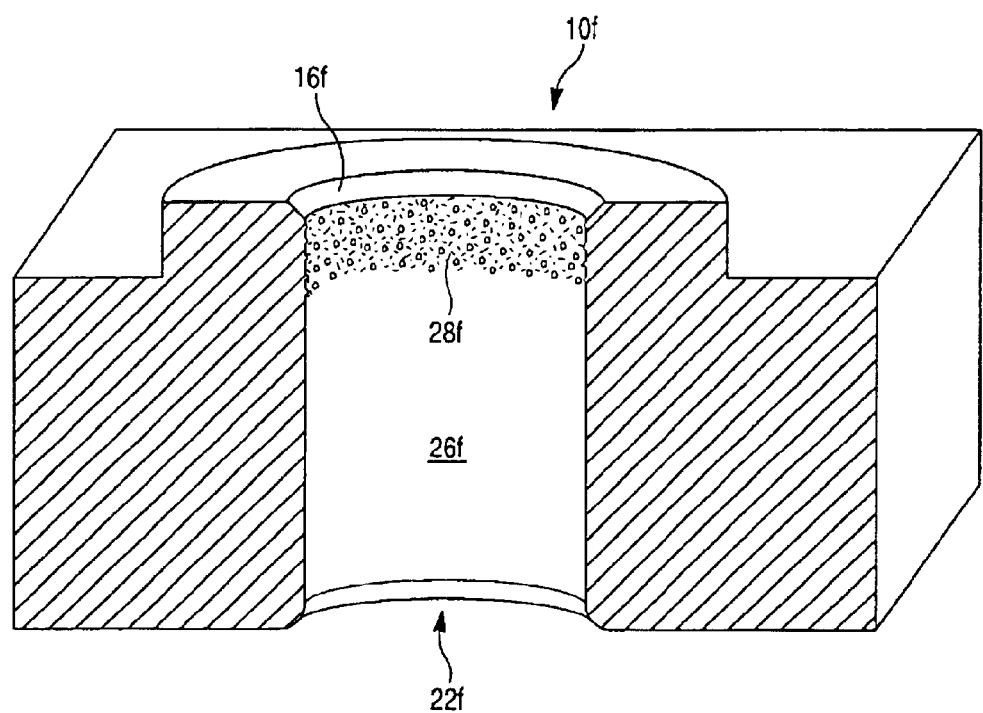
FIG. 14 is a cross-section of another alternative embodiment of the present invention.

In FIG. 14 a modification of the fastening element designated generally at 10f, which is generally similar to that shown in FIGS. 3–4A with the suffix f added to the referenced numerals to indicate like parts. In this embodiment the indentation 28f has a slightly different form and geometry but is otherwise similar to those constructions previously described. In this embodiment the indentation 28f takes the form of a scuffed or scratched surface along a portion of the inner surface 26f of the bore 22f. The indentation 28f can take the form of a circular or angular grain or have a plurality of different angles, edges and/or voids in the surface 26f. The indentation 28f could also extend into the lead in area 16f. The roughened surface of the indentation 28f permits similar benefits regarding the alignment and reduced end load required for the self-tapping fastener. The use, performance, characteristics and construction of the embodiment illustrated in FIG. 14 are similar to those in the other embodiments described herein.

Referring now to FIGS. 15, 15A–B and 16A–C, various alternative constructions of indentations 28 are illustrated that have been cold formed into a fastening device 10. Although these embodiments illustrate the indentations as beginning in the respective lead in areas, it should be understood that the indentations could also begin in the respective inner surface 26 of the bores 22.

Figure 15:
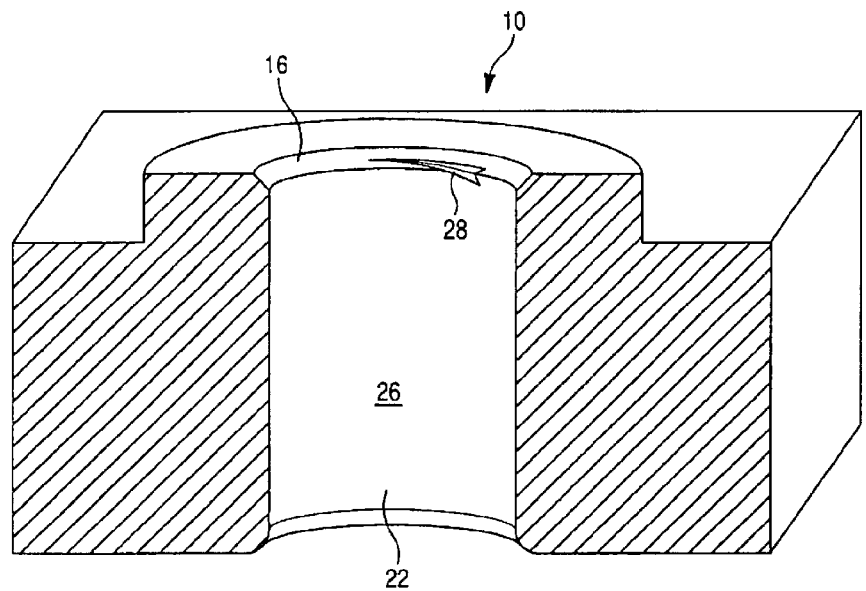
FIG. 15 is a cross-section of another alternative embodiment of the present invention.
Figure 15A:
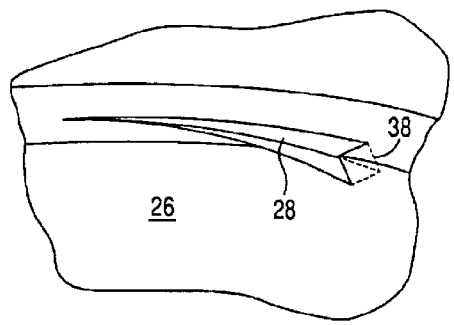
FIG. 15A is an exploded view of an alternative embodiment geometry to that shown in FIG. 15.
Figure 15B:
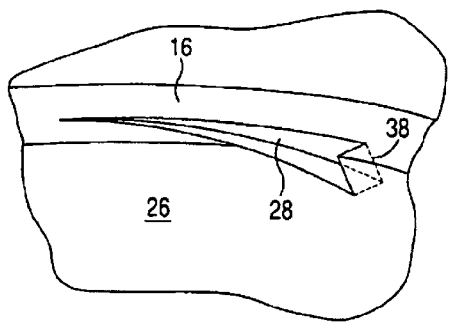
FIG. 15B is an exploded view of another alternative embodiment geometry to that shown in FIG. 15.
Figure 16A:
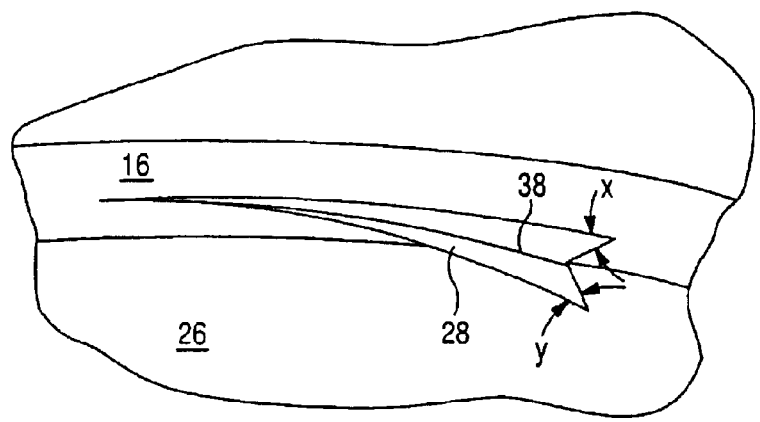
FIG. 16A is a partial perspective view of an alternative embodiment of the present invention.
Figure 16B:
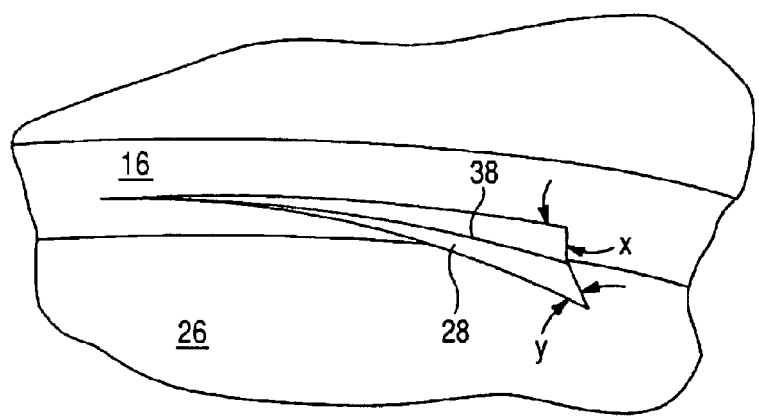
FIG. 16B is a partial perspective view of another alternative embodiment of the present invention.
Figure 16C:
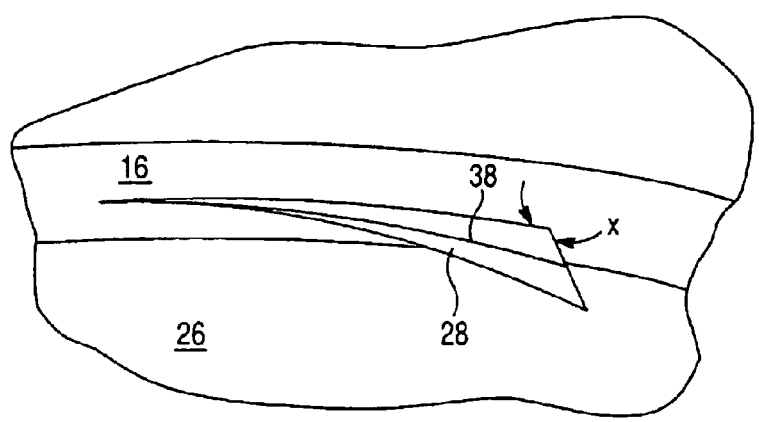
FIG. 16C is a partial perspective view of another alternative embodiment of the present invention.

As illustrated in FIGS. 15A and 15B the profile of an indentation having a substantially flat base 38 can vary from a substantially square configuration to one that has a flatter rectangular configuration. Similarly FIGS. 16A–C illustrate indentations 28 having an angled base 38. Such a configuration may vary from having an upper angle designated as X that is either less than, equal to or greater than 90 degrees. The lower angle designated as Y can be similarly varied.

EXAMPLES

The following examples will serve to illustrate some of the novel features and advantages of the present invention. While these examples show one skilled in the art how to operate within the scope of this invention, they are not to serve as a limitation on the scope of the invention. A series of tests were conducted to evaluate the performance of various configurations of the fastening element of the present invention.

Referring to FIG. 10, the test fixture that was utilized is illustrated and generally referred to at 62 to determine the load required to start. Each fastening element 10 that was tested was placed in a nut fixture 64 that was slidably connected along two rails 66 to permit engagement with a force gauge 68. A self-tapping fastener 40 was placed in a socket or on a drive bit collectively referred to as 69 mounted on a torque gun 70. The torque gun was then started and moved into engagement with the fastening element in order to form mating threads therein. The required end load was measured for each fastening element. The alignment of the self-tapping fastener in the resulting formed threads of the fastening element was also inspected.

In all of the tests, both unthreaded fastening elements without indentations and those with various indentations in accordance with the present invention were tested. In general, in the case of the unthreaded nuts without any indentation, the bolt just spun and did not start threading until a gradual load or force was applied. This is what has been referred to previously as end load. The fastening elements that had an indentation of the type of one of the embodiments described above, allowed the bolt to start threading immediately as the torque gun started with virtually no end load required. The alignment of all of the self-tapping fasteners used in the examples was likewise consistently straighter than those driven into nuts without indentations.

Example 1

In this example, the force required to start the tapping process for unthreaded nuts having a central bore without any indentations was compared against nuts having a single indentation and multiple indentations in accordance with the present invention. The indentations had a depth less than the ultimate thread formed by the self-tapping fastener and had the same helix angle or pitch as the threads of the self-tapping fastener. All bolts used were M12 TAPTITE® trilobular bolts. The nuts were untapped with 11.2 mm diameter holes. The results were as follows:

| No Indentation Force/Lbs. | Single Indentation Force/Lbs. | Dual Indentation Force/Lbs. |
|---|---|---|
| 14.5 | .5 | .5 |
| 14.5 | .5 | .5 |
| 16.5 | .5 | .5 |
| 19.0 | .5 | .5 |
| 13.0 | .5 | Ave. .5 Lbs. |
| 18.5 | .5 | |
| 10.0 | .8 | |
| 10.0 | .2 | |

-continued

| No Indentation Force/Lbs. | Single Indentation Force/Lbs. | Dual Indentation Force/Lbs. |
|---|---|---|
| 18.0 | Ave. .5 Lbs. | |
| 19.0 | | |
| 14.5 | | |
| Ave. 15.5 Lbs. | | |

As illustrated in these results, the nuts having one or more indentations in accordance with the present invention continuously exhibited a dramatically reduced required force or end load to start the tapping process as compared to those that did not have any such indentations.

Example 2

In this test, all bolts utilized were again M12×1.75 TAPTITE® trilobular bolts. All nuts used were untapped with 11.2 mm diameter holes. Various types of indentations were made in the nuts as indicated below and measured against nuts without any such indentations. The results were as follows:

| No. | Circumferential Length | End Load (Lbs.) |
|---|---|---|
| Nuts With Indentations Cut In Nut With Standard M12 TAPTITE ® Bolt | | |
| 1 | 90° | 0.5 |
| 2 | 90° | 0.5* |
| 3 | 90° | 0.5 |
| 4 | 90° | 1.0* |
| 5 | 90° | 0.5 |
| Nuts With Thread Indentation Rolled In Nut With Captive Point Bolt | | |
| 1 | 180° | .5 |
| 2 | 180° | .5* |
| 3 | 180° | .5 |
| 4 | 180° | 1.0 |

| No. | Circumferential Length | End Load (Lbs.) |
|---|---|---|
| Nuts With No Indentation | | |
| 1 | | 13.0 |
| 2 | | 5.0 |
| 3 | | 9.5* |
| 4 | | 12.0 |
| 5 | | 9.5* |
| Nuts With Machined Indentation | | |
| 1 | 270° | .5 |
| 2 | 360° | 1.0* |
| 3 | 360° | .5 |
| 4 | 180° | .5* |

*Denotes Bolts That Had Flattened Lead Threads

The results indicated that all of the nuts having indentations in accordance with the present invention regardless of the type and circumferential extent of the indentation required a dramatically reduced end load to start the tapping process compared to nuts without any such indentations. This was likewise true for bolts that had flattened lead threads.

Example 3

A third example was conducted to attempt to measure the effect of a single notched type indentation made in an unthreaded nut to compare the effect of various circumferential lengths of such indentations on the performance of the fastening element. All of the indentations had a depth that was less than the ultimate thread formed by the self-tapping fastener. TAPTITE® trilobular bolts were again used. The results were as follows:

| No.: | Circumferential Length- | | | | | | |
|---|---|---|---|---|---|---|---|
| | 30° | 60° | 90° | 120° | 180° | 270° | 360° |
| Nuts With Single Indentation | | | | | | | |
| 1 | 1 | 1.5 | 0.5 | 0.5 | 0.5 | 1 | 0.5 |
| 2 | 1.5 | 2 | 0.5 | 0.5 | 0.5 | 2.5 | 0.5 |
| 3 | 1 | 0.5 | 0.5 | 0.5 | 0.5 | 0.5 | 0.5 |
| 4 | | 0.5 | 1 | 1 | 0.5 | 0.5 | 0.5 |
| 5 | | 0.5 | 0.5 | 0.5 | 1 | 0.5 | 0.5 |
| Nut With No Indentations | | | | | | | |
| 1 | 13.5 | | | | | | |
| 2 | 9.5 | | | | | | |
| 3 | 6.5 | | | | | | |

All of the values above are pounds of force required to start the self-tapping bolts, also referred to as end load. In this example the nuts with an indentation consistently required an end load many times lower than those nuts without indentations to start the self-tapping bolts. This was true regardless of the circumferential length of the indentation.

While the principles of the invention have been made clear in illustrative embodiments, it will be obvious to those skilled in the art that many modifications of structure, arrangement, proportions, the elements, materials and components can be used in the practice of the invention, which are particularly adapted to specific environments and operative requirements without departing from those principles. The appended claims are intended to cover and embrace any and all such modifications, within the spirit and scope of the invention.

I claim:

1. A fastening element for forming a fastener assembly by engagement with a self-tapping fastener, comprising:
    a body having a threadless substantially cylindrical bore extending axially through a portion thereof; and
    an indentation in said bore that is smaller in at least one dimension than the thread that is formed by the self tapping fastener, said indentation having a first end located in close proximity to one end of said bore and a second end, said indentation further defining a guide for receiving a portion of the thread of said self-tapping fastener that upon engagement of said portion of said thread with said guide reduces the required end load to start the tapping process.

2. The fastening element of claim 1, wherein said indentation extends circumferentially around said bore from about 1 degree to less than 360 degrees.

3. The fastening element of claim 1, wherein said indentation is substantially the same depth along its entire length.

4. The fastening element of claim 1, wherein the depth of said indentation is less than the thread depth of said self-tapping fastener.

5. The fastening element of claim 1, wherein said indentation has a substantially flat sidewall.

6. The fastening element of claim 1, wherein said indentation has an angled sidewall.

7. The fastening element of claim 1, wherein said bore extends completely through said body.

8. The fastening element of claim 1, wherein said indentation is helical.

9. The fastening element of claim 1, wherein said indentation is helical and is disposed at substantially the same angle as the thread of the said self-tapping fastener.

10. The fastening element of claim 1, wherein said indentation has a substantially rounded sidewall.

11. The fastening element of claim 1, wherein said guide assists in establishing proper axial alignment of said self-tapping fastener in said bore upon engagement of said portion of said self-tapping fastener with said indentation.

12. The fastening element of claim 1, wherein said indentation is smaller and at least two dimensions than the thread formed by the self-tapping fastener.

13. The fastening element of claim 1, wherein said indentation is smaller in all dimensions than the thread formed by the self-tapping fastener.

14. The fastening element of claim 1, wherein said indentation extends circumferentially around said bore from about 5 degrees to about 180 degrees.

15. The fastening element of claim 1, wherein said indentation extends circumferentially around said bore for greater than 360 degrees.

16. The fastening element of claim 1, wherein said second end is located near the same end of said bore as said first end.

17. The fastening element of claim 1, wherein the depth of said indentation is not substantially the same along its entire length.

18. The fastening element of claim 1, wherein the width of said indentation is not substantially the same along its entire length.

19. The fastening element of claim 1, wherein the width of the indentation increases from a minimum at said first end thereof to a maximum at said second end thereof.

20. The fastening element of claim 1, wherein said indentation is tapered at least at one of said first and seconds ends.

21. The fastening element of claim 1, wherein said body has a lead in area that extends outwardly from said bore and said first end of said indentation is located within said lead in area.

22. The fastening element of claim 1, wherein said indentation further comprises a bottom edge that is substantially flat.

23. The fastening element of claim 1, wherein said indentation further comprises a bottom edge that is angled.

24. The fastening element of claim 23, wherein said edge has substantially the same angle as the thread of said self-tapping fastener.

25. The fastening element of claim 1, wherein at least one of said first and second ends of said indentation is substantially perpendicular to said bore.

26. The fastening element of claim 1, wherein both of said first and second ends are substantially perpendicular to said bore.

27. The fastening element of claim 1, wherein said indentation reduces the required end load to start the tapping process by at least 50 percent.

28. The fastening element of claim 1, wherein said bore has substantially constant diameter along its entire length.

29. The fastening element of claim 1, wherein said bore has a first area where threads will be formed therein by engagement with the self tapping fastener and said indentation is in said first area of said bore.

30. The fastening element of claim 1, wherein said bore has a diameter substantially equal to the pitch diameter of the self tapping fastener along its entire length.

31. The fastening element of claim 1, wherein said indentation in said bore is smaller in at least one cross sectional dimension than the cross section of the thread that is formed by said self tapping fastener.

32. A fastening element for forming a fastener assembly by engagement with a self-tapping fastener, comprising:

a body having a threadless substantially cylindrical bore extending axially through a portion thereof; and a first indentation in said bore that is smaller in at least one dimension than the thread that is formed by the self-tapping fastener, said first indentation having a first end located in close proximity to one end of said bore and a second end, said first indentation further defining a guide for receiving a portion of the thread of said self-tapping fastener that upon engagement of said portion of said thread with said guide reduces the required end load to start the tapping process; and a second indentation in said bore that is smaller in at least one dimension than the thread that is formed by the self-tapping fastener.

33. The fastening element of claim 32, wherein said first and second indentations are dimensionally different.

34. The fastening element of claim 32, wherein said first and second indentations are dimensionally the same wherein at least one of said first and second indentations assist in establishing proper axial alignment of said self-tapping fastener in said bore upon engagement.

35. The fastening element of claim 32, wherein said first and second indentations extend circumferentially around said bore less than 360 degrees in total.

36. The fastening element of claim 32, wherein said first and second indentations extend greater than 360 degrees around the circumference of said bore.

37. The fastening element of claim 32, wherein said first and second indentations are parallel to each other.

38. The fastening element of claim 32, wherein said first and second indentations are not parallel to each other.

39. The fastening element of claim 32, wherein said bore has a substantially constant diameter along its entire length.

40. A method of forming a fastener assembly by engaging a fastening element to a self-tapping fastener, comprising:

providing a fastening element having a body with a threadless bore extending axially through a portion thereof and an indentation that is smaller in at least one dimension than the thread that is formed by the self-tapping fastener, said indentation further defining a guide for receiving a portion of the thread of self-tapping fastener;

inserting a portion of said self-tapping fastener into said bore;

applying a force to said self-tapping fastener;

engaging a portion of said thread of self-tapping fastener with said indentation and thereby reducing the required end load to start the tapping process; and continuing to apply force to said self-tapping fastener until a thread is formed within said threadless bore.

41. The method of claim 40, wherein the thread formed in said continuing step is formed in the area of said indentation.

42. The method of claim 40, wherein said bore and said providing step has a substantially constant diameter along its entire length.

43. The method of claim 40, wherein said indentation provided in said providing step is located in said bore and said continuing step forms a thread that substantially replaces said indentation within said bore.

* * * * *